(12) United States Patent
Nygren et al.

(10) Patent No.: US 8,807,302 B2
(45) Date of Patent: Aug. 19, 2014

(54) SHOCK ABSORBER WITH DUAL PISTON

(75) Inventors: Nils Göran Nygren, Huddinge (SE); Johan Jarl, Stockholm (SE)

(73) Assignee: Ohlins Racing AB, Upplands Vasby (SE)

(*) Notice: Subject to any disclaimer, the term of this patent is extended or adjusted under 35 U.S.C. 154(b) by 224 days.

(21) Appl. No.: 12/747,502

(22) PCT Filed: Dec. 17, 2008

(86) PCT No.: PCT/SE2008/051484
§ 371 (c)(1),
(2), (4) Date: Oct. 11, 2010

(87) PCT Pub. No.: WO2009/082339
PCT Pub. Date: Jul. 2, 2009

(65) Prior Publication Data
US 2011/0017557 A1 Jan. 27, 2011

(30) Foreign Application Priority Data
Dec. 19, 2007 (SE) ........................ 0702838

(51) Int. Cl.
*F16F 9/34* (2006.01)
(52) U.S. Cl.
USPC ................................ 188/322.15; 188/322.22
(58) Field of Classification Search
USPC ................... 188/283, 322.13, 322.15, 322.22
See application file for complete search history.

(56) References Cited

U.S. PATENT DOCUMENTS 2,225,986 A * 12/1940 Glezen ........................ 188/314
(Continued)

FOREIGN PATENT DOCUMENTS

| JP | 10-339346 | 12/1998 |
|----|-----------|---------|
| JP | 2001-082522 A | 3/2001 |

(Continued)

OTHER PUBLICATIONS

International Search Report; PCT/SE2008/051484; Mailing Date: Mar. 17, 2009; 3 pages.

*Primary Examiner* — Anna Momper
(74) *Attorney, Agent, or Firm* — Knobbe Martens Olson & Bear, LLP

(57) ABSTRACT

A shock absorber comprising a damping cylinder is divided into a first damping chamber and a second damping chamber by a main piston device. The main piston device comprises a first main piston and a second main piston. The main pistons comprise continuous ducts that are delimited in a direction of flow by first and second flow limiters. The main pistons are mounted on a piston rod. The piston rod has an axially extending and continuous cavity through which damping medium can flow between a pressurized chamber and a respective damping chamber. The damping medium flows via an interspace delimited by the first main piston and the second main piston out into the damping chambers via pressurization ducts delimited by the first flow limiters. The first flow limiters lift axially from the main piston with substantially maintained external form in the opening process so that a flow path is created both between the main piston and the whole or parts of the inner periphery of the first flow limiter as well as between the main piston and the outer periphery of the first flow limiter.

21 Claims, 4 Drawing Sheets

(56) References Cited

U.S. PATENT DOCUMENTS

| | | | |
|---|---|---|---|
| 4,106,596 A | | 8/1978 | Hausmann |
| 5,351,790 A | * | 10/1994 | Machida ................. 188/314 |
| 5,709,290 A | * | 1/1998 | Ekert et al. ............... 188/322.15 |
| 6,120,049 A | * | 9/2000 | Gonzalez et al. ............. 280/276 |
| 6,776,269 B1 | | 8/2004 | Schel |
| 7,048,099 B2 | * | 5/2006 | Umezawa ................ 188/322.14 |
| 2002/0027051 A1 | | 3/2002 | Grundei |
| 2005/0263363 A1 | * | 12/2005 | Katou et al. ............. 188/322.22 |
| 2009/0038898 A1 | | 2/2009 | Zeissner et al. |

FOREIGN PATENT DOCUMENTS

| | | |
|---|---|---|
| JP | 2002-106624 A | 4/2002 |
| JP | 2005-249202 A | 9/2005 |
| JP | 2006-170332 A | 6/2006 |
| JP | 2006-283924 A | 10/2006 |
| JP | 2007-523298 A | 8/2007 |
| JP | 2009-506268 A | 2/2009 |
| WO | WO 2005/076790 A2 | 8/2005 |
| WO | WO 2005098262 A1 | 10/2005 |
| WO | WO 2007/022920 A1 | 3/2007 |

* cited by examiner

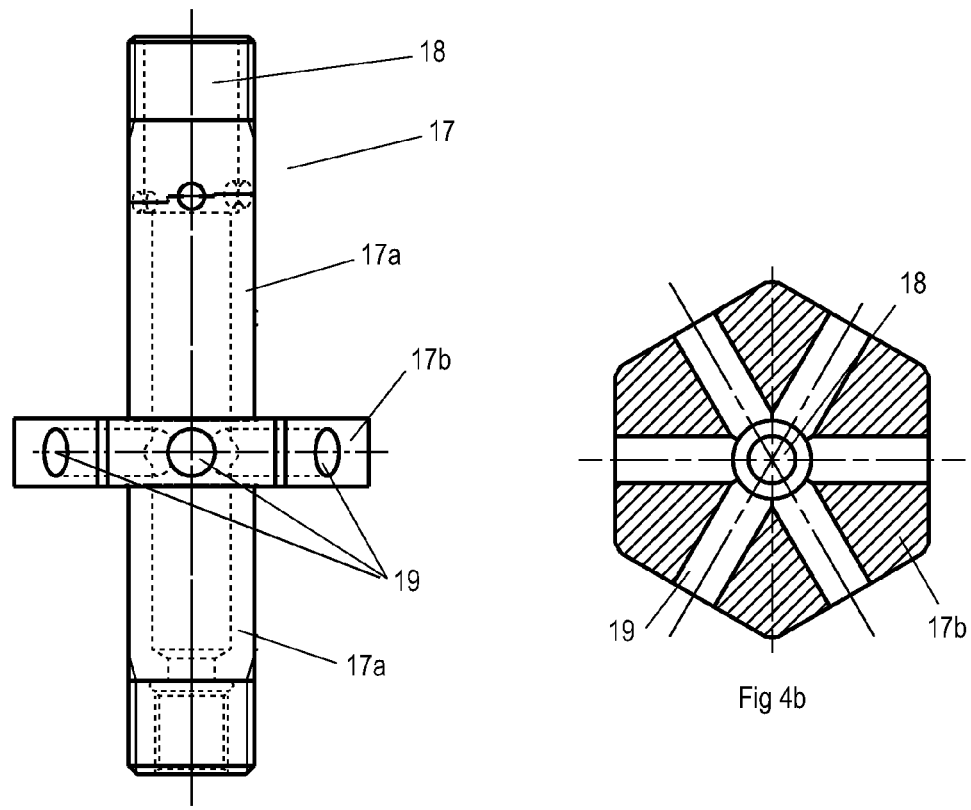
Fig 4a
Fig 4b
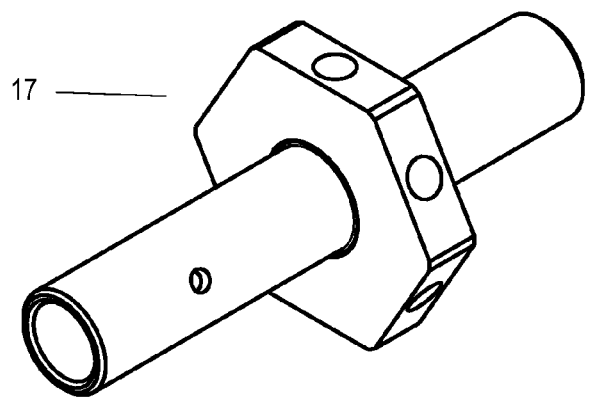
Fig 4c

_US 8,807,302 B2_

SHOCK ABSORBER WITH DUAL PISTON

CROSS-REFERENCE TO RELATED APPLICATIONS

This application is a U.S. National Phase of International Application No. PCT/SE2008/051484, filed Dec. 17, 2008, which claims priority to Swedish Patent Application No. 0702838-4, which was filed on Dec. 19, 2007.

BACKGROUND OF THE INVENTION

1. Field of the Invention

The invention relates to a shock absorber, in which compression and return damping is realized with double pistons and in which pressurization of the absorber is realized between the pistons.

2. Description of the Related Art

The Applicant produces a shock absorber 1, see FIGS. 1 and 1a, comprising a damping-medium-filled cylinder body 2, which is delimited at the ends and is divided into a first damping chamber C1 and a second damping chamber C2 by a main piston device that is made up of two main pistons 4, 5.

The main pistons 4, 5 are mounted on a hollow piston rod 3, which extends through one of the ends 2a of the cylinder body. Through the piston rod 3, damping medium flows between a pressurized chamber 6a into a pressurization reservoir 6 and a respective damping chamber C1, C2. The pressurized damping medium is led from the pressurization tank 6 via a duct 7 in the piston rod 3 to an interspace 8 between the main pistons 4, 5. The damping medium is led onward via continuous pressurization ducts 9, 10 extending through the main pistons 4, 5 and delimited by first flow limiters 11, 12, in order finally to be led out into the respective damping chamber C1, C2. One of the main pistons 4 damps motion substantially in a first direction R1, i.e. the compression direction, where the main piston device moves such that the shock absorber length decreases, and the other of the main pistons 5 damps motion in substantially another direction R2, i.e. the return direction, where the main piston device moves such that the shock absorber length increases. The damping is realized through deformation of a second flow limiter created by a collection of flexible first washers 15, 16, which delimit the main flow ducts 13, 14 extending through the main piston.

By virtue of this design, it is possible to ensure that a pressure markedly greater than zero always prevails in the damping chambers. This since the pressure in the damping chambers C1 and C2 is only marginally lower than the pressure P1, owing to the low fall in pressure over the flow limiters 11 and 12 and the fact that the interspace 8 common to both chambers is also pressurized at the same pressure. The pressurized damping medium is led out into the respective damping chamber C1, C2 via a collection of flexible second washers 11$_{PA}$, 12$_{PA}$, i.e. shims. The flexible second washers are fixed in place by their inner diameter such that they flex around their central part and let through a damping medium flow only via their outer part, which diverges from the first side of the main piston and therefore leaves an opening area which is disposed on the outer diameter of the second washers, see FIG. 1b. In order to achieve minimal flow resistance in the direction out from the interspace, the collections of flexible washers have been chosen to be as soft as possible such that they can open with just a very small pressure difference between the respective damping chamber and the interspace.

Problems have then arisen, since very soft washers easily become unstable and start to deform unpredictably with the flow. The whole of the dynamics of the absorber are in this case impaired and unexpected vibrations and noise can arise.

A further problem with shock absorbers produced according to the previously known method arises when the main pistons are mounted on the piston rod. In order not to create unwanted restrictions in the flow between the pressurization tank and the intermediate chamber, the pressurized damping medium flowing from the pressurization tank through the piston rod must have a large area to pass through. The previous solution has a separate intermediate part 17$_{PA}$, which separates the two pistons. This intermediate part is difficult to fit, so that the flow paths 17$_{PA}$a through the piston rod and the intermediate part end up centered one above the other and just a minor displacement between these parts creates a reduced flow area.

In order to alleviate the problem with centering of the flow paths, an internal recess 17$_{PA}$b has been introduced in the intermediate part. In order to minimize the flow resistance, this recess has a large radial extent. The mounting of the main pistons on this intermediate part may also be a problem, since the intermediate part 17$_{PA}$ with its recess 17$_{PA}$b is easily deformed when the main pistons are fitted by tightening of a retaining nut 20$_{PA}$. In order to make it easy to change the damping character of the shock absorber by varying the washers (shims) with regard to size, thickness, number and mutual arrangement, then a simple and straightforward procedure must exist for the removal and fitting of the main pistons.

SUMMARY OF THE INVENTION

The present invention sets out to solve the dynamics problems which arise in a shock absorber which is pressurized via a space between a main piston device consisting of two main pistons.

In addition, the invention aims to solve problems in fitting the main pistons in the shock absorber without the damping medium flow in the shock absorber being limited or the fitting/removal procedure being made more difficult.

Moreover, these problems must be solved in an economical and simple manner.

The invention relates to a shock absorber comprising a damping-medium-filled damping cylinder that is divided into a first and a second damping chamber by a main piston device. The main piston device is made up of a first main piston and a second main piston having continuous ducts that are delimited in a direction of flow by first and second flow limiters. The main piston device is mounted on a piston rod having an axially extending and continuous cavity, through which damping medium can flow. The continuous cavity couples together a pressurized chamber in a pressurization reservoir and a respective damping chamber via an interspace, delimited by the first and the second main piston, in the main piston device. A first damping medium flow from the interspace to the first and the second damping chamber is designed to flow substantially without resistance through pressurization ducts delimited by a first flow limiter. In the opening process, the first flow limiter lifts in the axial direction from the main piston with substantially maintained external form, so that a flow path is created both between the main piston and the whole or parts of the inner periphery of the first flow limiter, as well as between the main piston and the outer periphery of the flow limiter.

The fact that the first flow limiter can move axially allows it to be made more rigid without any significant increase in flow resistance. It therefore no longer needs to be extremely thin and flexible in the bending direction.

In a first embodiment of the invention, the first flow limiter is rigid and inflexible in the axial direction and has the form of a sealing washer which has an inner edge and an outer edge with respective extent in the radial direction, as well as a certain extent, preferably 0.2-0.5 mm, in the lateral direction. As a result of this embodiment, the first flow limiter opens by lifting from the main piston, at the same time as it is fully leak-tight when bearing against the bearing surface, i.e. when the pressure in the damping chambers is greater than the pressure in the intermediate chamber. The first flow limiter therefore acts as a nonreturn valve.

The first flow limiter lifts from the main piston substantially parallel with the piston rod in relation to a spacer sleeve disposed on that face of the main piston which faces the damping chambers, within the inner radial extent of the flow limiter.

In its simplest embodiment, the sealing washer of the nonreturn valve is circular, both internally and externally. In order to allow slight overlap and thus narrow contact areas on the bearing surface, a good centering of the sealing washer around the spacer sleeve is required. Narrow contact areas are a precondition for a rapid-reaction valve, since wide contact areas retard both the opening and the closing processes. This because, with wide contact areas, the damping medium is forced to flow long distances in narrow gaps. Viscous damping arises, which brakes the flow. At the same time, it is important not to forego good leak-tightness of the nonreturn valve when in the closed state.

In a third embodiment, the first flow limiter has, on its inner edge, lugs which extend radially inward toward the center. The lugs have a radial extent dimensioned such that their inner edge is designed to center the flow limiter on the spacer sleeve.

By configuring the sealing washer with lugs extending radially inward toward the center, a good centering is obtained between the sealing washer and its seat. Moreover, only slight overlap is created between the sealing washer and the seat of the main piston, thereby giving a fast opening function.

The above-described lugs also mean that a maintained restriction and centering is possible, but with a reduced inner restriction of the flow between the inner edge of the flow limiter and the spacer sleeve around which the flow limiter is centered. The narrow gap which is formed between the inner edge of the flow limiter and the spacer sleeve is in this case significantly shorter in its extent than if the inner edge is fully circular on the inside. This leads to reduced viscous damping in the gap and reduced resistance to guiding the flow limiter through the damping medium.

A further advantage of the lugs is that more damping medium can pass within the flow limiter. This creates a lower flow resistance. The extra possible flow area which is formed between the lugs on the inner edge is particularly important with small lift heights of the sealing washer in connection with opening or closing of the nonreturn valve.

In a fourth embodiment, reduced flow resistance and centering of the first flow limiter are obtained by the lugs being instead disposed in the spacer sleeve.

In a further embodiment, the interspace between the first and the second main piston is created by the first and the second main piston bearing against an intermediate part. The intermediate part is made of a solid piece of material, but can be said to be made up of a cylindrical part and a supporting part extending radially therefrom approximately centrally on the cylindrical part.

In the radially extending supporting part, substantially radially extending third ducts are disposed, through which the damping medium flows between the pressurized chamber in the pressurization reservoir and the interspace is transported out into the interspace.

BRIEF DESCRIPTION OF THE DRAWINGS

The invention is described in greater detail below, with references to the accompanying drawings.

FIG. 2a shows a shock absorber that is arranged and configured in accordance with certain features, aspects and advantages of the invention.

FIG. 2b shows an enlarged view of the piston portion in the shock absorber shown in FIG. 2a.

FIG. 4a shows an enlarged view of an intermediate part.

FIG. 4b shows the intermediate part with a section through a radially projecting supporting part.

FIG. 4c shows a perspective view of the intermediate part.

DETAILED DESCRIPTION OF THE PREFERRED EMBODIMENT

Figures 1A, 1B:
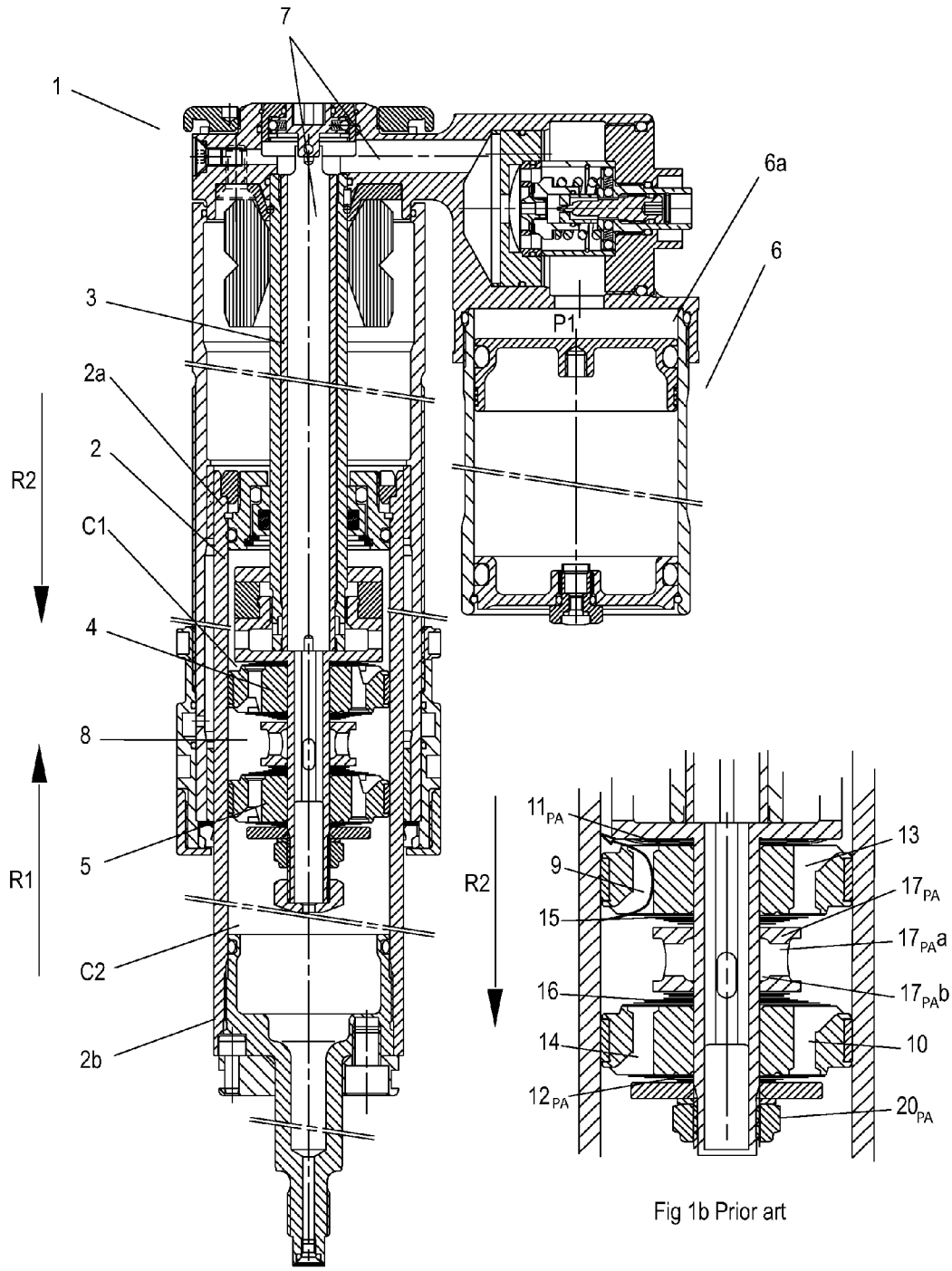
FIG. 1a shows a shock absorber according to the prior art.
FIG. 1b shows an enlarged view of the piston portion in the prior art.
Figures 2A, 2B:
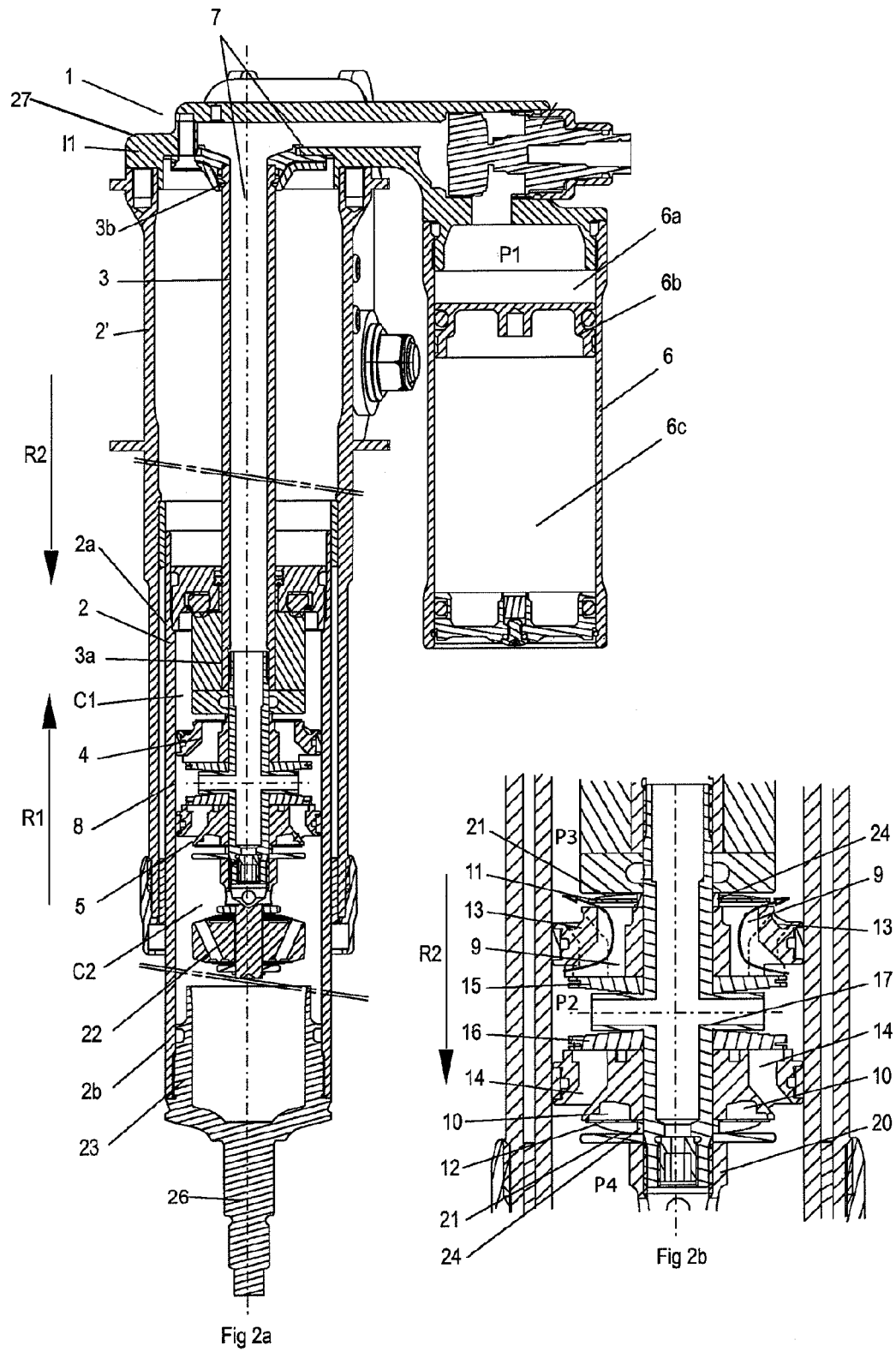

A shock absorber 1, which is arranged and configured in accordance with certain features, aspects and advantages of the invention, see FIGS. 2a and 2b, as a basic construction corresponding to the prior art shown in FIG. 1. The shock absorber thus comprises a damping-medium-filled damping cylinder body 2, which is delimited at the ends 2a, 2b and is divided into a first damping chamber C1 and a second damping chamber C2 by a main piston device made up of two main pistons 4, 5. The damping medium is preferably hydraulic oil, which can contain associated additives in a manner that is known per se. Alternatively, glycol and/or water can be used as the fluid. The damping cylinder body 2 is preferably also telescopically disposed in a second cylinder 2'.

The main pistons 4, 5 are mounted on a first end 3a of a hollow piston rod 3, which extends through one of the ends 2a of the cylinder body and which moves with the second cylinder 2'. Through the piston rod 3, damping medium flows between a pressurized chamber 6a in a pressurization tank 6 and a respective damping chamber C1, C2. In the pressurization tank 6 there is disposed a pressurizing member 6b in the form of a piston, rubber bladder or the like. The pressurization tank encloses a first pressurized and damping-medium-filled chamber 6a. The pressurizing member 6b also delimits the pressurization tank 6 in a second space 6c, which comprises a second medium more compressible than the damping medium. The compressible medium can be constituted by gas, for example air, nitrogen gas or other gas with additives. By filling of compressible medium into the second space, the basic pressure P1 is created, which pressurizes the damping medium. The compressible medium can also be replaced by a mechanical member, such as a spring or the like.

Pressurization of the absorber, and also the damping character of the absorber, is adjusted by one or more valves according to the prior art that are disposed between the pressurization tank 6 and the damping cylinder part 2.

The pressurized damping medium is led from the pressurization tank 6 via a duct 7 in the piston rod 3 to an interspace 8 defined between the main pistons 4, 5. This interspace 8 acquires a pressure P2, which is substantially equal to the basic pressure P1. The damping medium can flow onward via continuous pressurization ducts 9, 10 in the main pistons 4, 5 out into a respective damping chamber C1, C2, so that the damping chambers, too, at least acquire the pressure P1=P2 (with possible pressure changes due to the fall in pressure over the flow limiters). A first flow limiter 11, 12 bears against a first side 4a, 5a of the main pistons 4, 5 and acts as a nonreturn valve and prevents flow through the pressurization duct 9, 10 in the direction away from one of the damping chambers C1, C2 to the intermediate chamber or interspace 8. Instead, the damping medium flow 8 is forced from the first and the second damping chamber to the interspace 8 via main flow ducts 13, 14 extending through the main pistons 4, 5.

One of the main pistons 4 damps motion in a first direction R1, i.e. the return direction, when the main piston device moves such that the shock absorber length decreases and the pressure P3 in the first damping chamber C1 increases, and the second of the main pistons 5 damps motion in a second direction R2, i.e. the compression direction, when the main piston device moves such that the shock absorber length increases and the pressure P4 in the second damping chamber C2 increases. The damping is realized via deformation of a second flow limiter 15, 16, preferably a collection of flexible first washers, which delimit the main flow ducts 13, 14 extending through the main piston and which bear against a second main piston side 4b, 5b.

The damping medium thus flows between the first damping chamber C1 and the second damping chamber C2 via the main flow ducts 13 of the first main piston 4, through the interspace 8 and out through the pressurization ducts 10 of the second main piston 5. From the second damping chamber C2 to the first damping chamber C1, the damping medium flows via the main flow ducts 14 of the second piston 5, through the interspace 8 and out through the pressurization ducts 9 of the first main piston.

The second piston rod end 3b is fixed in a first fastening member 26, which is intended to fasten the absorber to a part of a particular vehicle which moves with the ground surface, preferably a wheel or runner. The second cylinder 2', arranged concentrically around the damping cylinder part 2, is also fixed in the first fastening member 26. On the first end 2a of the damping cylinder 2, the absorber has a second fastening member 27, which can be fixed in a chassis or frame part of a particular vehicle. Of course, the opposite fitting direction is also possible.

In the invention, the first flow limiter 11, 12 is rigid and inflexible in the axial direction and has the form of one or more sealing washers having a certain extent both in the radial direction and in the axial direction. In the radial direction, they extend from an inner circular edge 11b2, 12b2 (see the inner dashed line in FIG. 3a) to an outer circular edge 11a, 12a, and in the axial direction the sealing washers preferably have a thickness of between 0.2 and 0.5 mm.

In FIG. 2b, it is shown that the first flow limiter 11, 12 lifts from the main piston 4, 5 with substantially maintained external form in the opening process, where a damping medium flow is created by the pressure P2 in the interspace 8 being greater than the pressure P3 in the damping chamber C1. The first flow limiter 11, 12 lifts from the first side 4a, 5a of the main piston 4, 5 in a direction substantially parallel with the piston rod 3 in relation to a spacer sleeve 24 disposed on that face of the main piston which faces the damping chambers, inside the inner edge 11b1, 12b1; 11b2, 12b2 of the flow limiter.

The spacer sleeve 24 is also necessary to enable the first flow limiter 11, 12 to lift from the main piston 4, 5, since there must then be a distance between that side of the main piston which faces the damping chambers C1, C2 and those parts between which the main pistons 4, 5 are axially fixed against.

The spacer sleeve 24 bears against an inner face A4i, A5i of the main piston 4, 5, and the inner edge 11b2, 12b2, of inner diameter d11i, d12i, of the first flow limiter 11, 12 is designed to slide against the outer face 24a of the spacer 24.

Figure 3A:
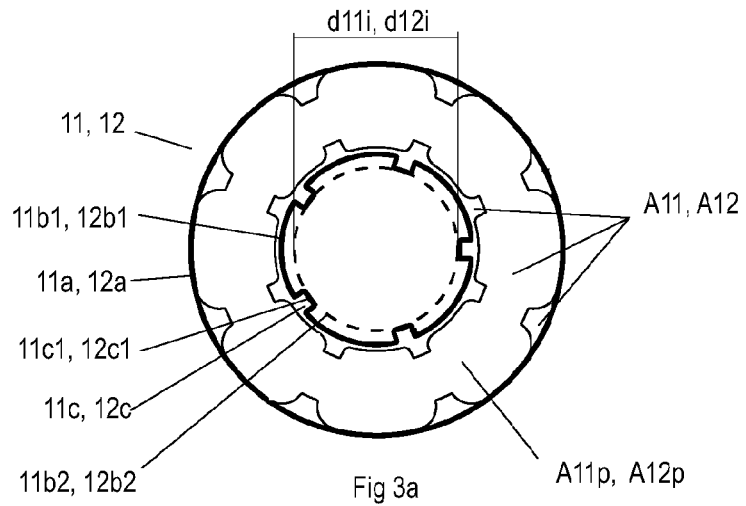
FIG. 3a shows a second flow limiter.

In FIG. 3a is shown the first flow limiter 11, 12, which, on its inner edge, has radially inward extending lugs 11c, 12c. The lugs 11c, 12c extend in the radial direction from an inner lug edge 11b1, 12b1 to an outer lug edge 11c1, 12c1. The outer lug edge 11c1, 12c1 substantially coincides with the inner diameter d11i, d12i of the flow limiter 11, 12 and is designed to center the flow limiter 11, 12 on the spacer sleeve 24. When the first flow limiter 11, 12 has opened and lifted from the main piston 4, 5, the damping medium can flow into the space between the lugs 11c, 12c.

Figure 3B:
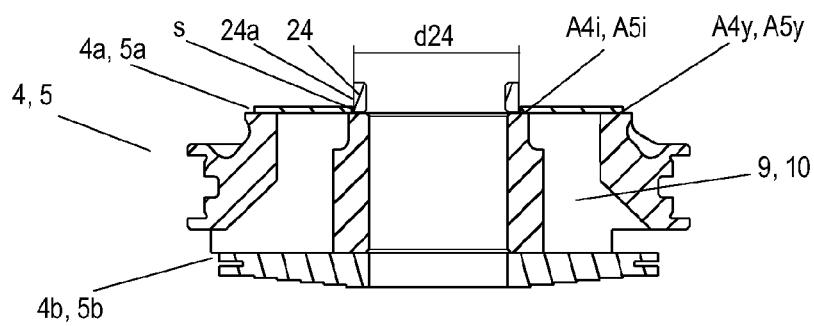
FIG. 3b shows a main piston with a section through a center of the piston.

In FIG. 3b, a closed valve is shown when there is no damping medium flowing in the pressurization duct 9, 10 and when the pressure P3, P4 in the damping chambers C1, C2 is greater than or equal to the pressure P2 in the intermediate chamber 8. The first flow limiter 11, 12 then rests on the inner A4i, A5i and the outer bearing surface A4y, A5y of the first side 4a, 5a of the main piston, which faces toward the respective damping chamber, and covers the continuous pressurization ducts 9, 10. The inner diameter d11i, d12i of the inner edge of the flow limiter is somewhat greater than the spacer sleeve outer radial extent d24. A gap s is thus created between the inner edge 11b1, 12b1; 11b2, 12b2 of the flow limiter 11, 12 and the spacer sleeve 24. In this gap s, the damping medium can flow with a certain restriction proportional to the size of the gap.

To enable the pressurized damping medium to flow substantially without resistance through the pressurization ducts 9, 10, the first flow limiters 11, 12 are configured such that the damping medium acts on a pressure area A11p, A12p of such size on the first flow limiters 11, 12 that, it substantially corresponds to the total area A11, A12 of the first flow limiter. The pressure area A11p, A12p of the first flow limiter is defined by the radially widened area which is formed between the inner first bearing surface A4i, A5i and the outer first bearing surface A4y, A5y disposed on the first side 4a, 5a of the main piston 4, 5. Preferably, the pressure area covers between 85 and 90% of the total area A11, A12 of the second flow limiter.

The low flow resistance is created by the pressurization ducts being made large with low flow resistance and by the first damping medium flow acting on a large pressure area on the second flow limiter, and by this being able with small force to open to a large opening area.

Figure 3C:
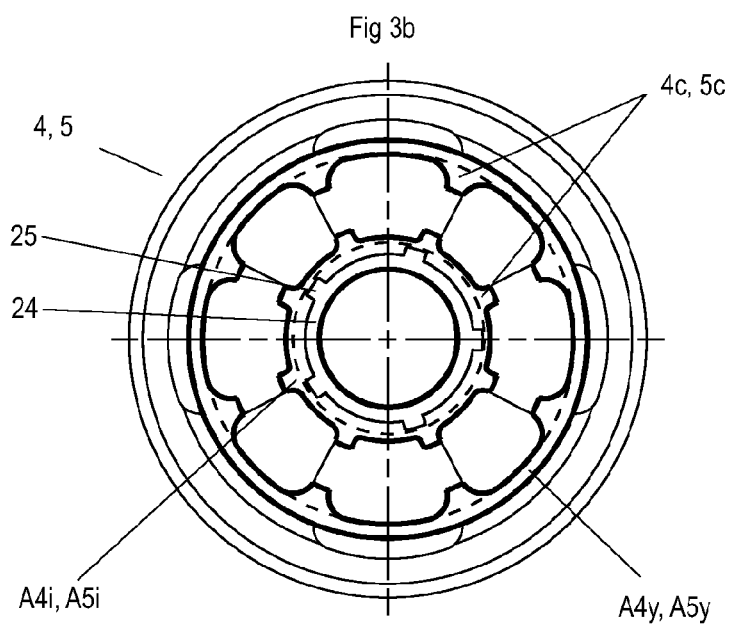
FIG. 3c shows a view of a side of the main piston that is directed toward the damping chambers.

In FIG. 3c, the main piston 4, 5 is shown with its A4i, A5i and outer first bearing surface A4y, A5y. The main piston 4, 5 is here configured such that the first flow limiter 11, 12 bears against knob-shaped supporting points 5c. By virtue of this embodiment, the first flow limiter receives sufficient support from the main piston, but produces a minimal holding effect in the opening process due to the reduced sealing surface. In this figure, an embodiment of the invention is also shown where centering of the first flow limiter 11, 12 is realized by the arrangement of radially projecting lugs 25 in the spacer sleeve 24.

In a further embodiment (not shown), the first flow limiter is guided on the outer side and the lugs are made in this case on the outer edge of the flow limiter or in an external guide device.

The two main pistons 4, 5 are disposed on an intermediate part 17 which is screwed onto the first end 3a of the piston rod.

The intermediate part 17 shown in FIGS. 4*a-c* is produced in one piece, but can be said to be made up of a cylindrical part 17*a*, which is an axial extension of the piston rod 3, and a supporting part 17*b* extending radially therefrom. The cylindrical part 17*a* also has a concentric hole 18, which connects to the cavity of the piston rod. The main pistons 4, 5 are arranged concentrically around the cylindrical part 17*a* on either side of the radially projecting supporting part 17*b*.

In the radially extending supporting part 17*b* there are disposed substantially radially extending third ducts 19, which lead from the concentric hole 18 disposed in the cylindrical part 17*a* to the interspace 8. The number of ducts 19 is determined by the size of the extent of the intermediate part 17 in the lateral direction, i.e. by the amount of material to be machined. Preferably, the number of ducts is 6-8. Despite the fact that the intermediate part 17 is perforated by a plurality of ducts 19, the rigidity of the part is maintained, since the whole of the intermediate part 17 is produced from one piece.

The main pistons 4, 5 are clamped to the intermediate part 17 and the piston rod 3 by a locking member 20, which is screwed onto the cylindrical part 17*a* of the intermediate part. In order to create a play-free fitting of the main pistons 4, 5 and prevent unwanted vibrations when the flow limiter opens, between the first main piston 4 and the piston 3, as well as between the main piston 5 and the locking member 20, a resilient member 21, preferably a corrugated washer, an elastic O-ring or the like, is provided. The locking member 20 can naturally be replaced by a simple nut $20_{P4}$, or the like.

In this embodiment of the invention, the locking member 20 has the form of a piston rod extender on which an additional damping piston 22 is mounted, see FIG. 2*a*. This additional damping piston 22 is intended to create a gentle braking, of the damping motion in the end position of a stroke in the first motional direction R1. The additional damping piston 22 has a radial extent which is less than the radial extent of the main pistons 4, 5 and is intended to slide into a limit space 23, tailored to the damping piston 22, in the form of a cup disposed in the damping cylinder part 2.

The invention is not limited to the embodiment shown, but can also be modified within the scope of the following patent claims and the inventive concept.

The invention claimed is:

1. A shock absorber comprising:
   a damping cylinder divided into a return damping chamber and a compression damping chamber by a main piston device;
   said main piston device comprising a first main piston and a second main piston, said first main piston comprising a first surface and a second surface, said second main piston comprising a first surface and a second surface, an interspace being defined between said second surface of said first main piston and said first surface of said second main piston of said main piston device;
   said first main piston and said second main piston being disposed on a fastening device, said fastening device secured to a piston rod, said piston rod comprising an axially extending and continuous cavity, said continuous cavity being configured to accommodate a damping medium flow between a pressurized chamber of a pressurization reservoir and at least one of said return damping chamber and said compression damping chamber;
   said first main piston comprising a first set of continuous pressurization ducts and said second piston comprising a second set of continuous pressurization ducts, a first main piston first flow limiter being positioned adjacent to said first surface of said first piston and a second main piston first flow limiter being positioned adjacent to said second surface of said second piston, said first main piston first flow limiter delimiting the first set of continuous pressurization ducts and said second main piston first flow limiter delimiting said second set of continuous pressurization ducts such that said interspace is fluidly connected to said compression damping chamber and said return damping chamber through said first main piston first flow limiter and said second main piston first flow limiter;
   said first main piston comprising a first set of main ducts and said second piston comprising a second set of main ducts, a first main piston second flow limiter being positioned adjacent to said second surface of said first main piston and a second main piston second flow limiter being positioned adjacent to said first surface of said second main piston;
   said first main piston first flow limiter and said second main piston first flow limiter allowing flow substantially without resistance through said first and second sets of continuous pressurization ducts such that the compression damping chamber and the return damping chamber are fluidly connected and said first main piston second flow limiter and said second main piston second flow limiter allowing flow into said interspace through said first and second sets of main ducts; and
   said first main piston first flow limiter and said second main piston first flow limiter are configured to lift axially away from said first main piston and said second main piston respectively with substantially maintained external form such that a first flow path is created both between said first main piston and at least at portion of an inner periphery of said first main piston first flow limiter and between said first main piston and at least a portion of an outer periphery of said first main piston first flow limiter, and such that a second flow path is created both between said second main piston and at least at portion of an inner periphery of said second main piston first flow limiter and between said second main piston and at least a portion of an outer periphery of said second main piston first flow limiter.

2. The shock absorber as claimed in claim 1, wherein said first main piston first flow limiter and said second main piston first flow limiter is rigid and inflexible in the axial direction and has a radial dimension.

3. The shock absorber as claimed in claim 2, wherein said first main piston first flow limiter and second main piston first flow limiter comprises a thickness of between 0.2 mm and 0.5 mm.

4. The shock absorber as claimed in claim 3, wherein said first main piston first flow limiter lifts from said first main piston in a direction generally parallel to said piston rod along a spacer sleeve that is positioned along said first surface of said first main piston, said spacer sleeve being positioned within an inner diameter of said first main piston first flow limiter.

5. The shock absorber as claimed in claim 4, wherein said spacer sleeve comprises an outer surface defined by an outer diameter of said spacer sleeve and said first main piston first flow limiter comprises an inner surface defined by said inner diameter of said first main piston first flow limiter, said inner surface of said first main piston first flow limiter and said outer surface of said spacer sleeve defining a gap that generally centers said first main piston first flow limiter in relation to said first main piston.

6. The shock absorber as claimed in claim 5, wherein said first main piston first flow limiter comprises a form of one or more annular sealing washers having a circular inner edge periphery and a circular outer edge periphery.

7. The shock absorber as claimed in claim 5, wherein said inner surface of said first main piston first flow limiter comprises radially extending lugs.

8. The shock absorber as claimed in claim 7, wherein said lugs center said first main piston first flow limiter on said spacer sleeve.

9. The shock absorber as claimed in claim 8, wherein a flow path is defined between adjacent lugs.

10. The shock absorber as claimed in claim 5, wherein said outer surface of said spacer sleeve comprises radially extending lugs, said lugs centering said first main piston first flow limiter about said spacer sleeve.

11. The shock absorber as claimed in claim 2, wherein the first main piston first flow limiter is located on one side of the first main piston and the first main piston second flow limiter is located on an opposite side of the first main piston.

12. The shock absorber as claimed in claim 2, wherein the second main piston first flow limiter is located on one side of the second main piston and the second main piston second flow limiter is located on an opposite side of the second main piston.

13. The shock absorber as claimed in claim 1, wherein said first main piston and said second main piston are separated by an intermediate part comprising a cylindrical portion and a supporting portion extending radially from said cylindrical portion.

14. The shock absorber as claimed in claim 13, wherein said first main piston and second main piston are arranged concentrically about said cylindrical portion with said supporting portion being positioned between said first main piston and said second main piston.

15. The shock absorber as claimed in claim 13, wherein radially extending ducts are defined within said supporting portion, said radially extending ducts being in fluid communication with said interspace and said axially extending and continuous cavity of said piston rod.

16. The shock absorber as claimed in claim 1, wherein the first main piston second flow limiter and the second main piston second flow limiter are deformable in the axial direction.

17. The shock absorber as claimed in claim 1, wherein said first main piston first flow limiter and said second main piston first flow limiter are configured such that the flow acts on a pressure area substantially corresponding to the total area of one of said first main piston first flow limiter and said second main piston first flow limiter, allowing flow substantially without resistance through said first and second sets of pressurization ducts.

18. The shock absorber as claimed in claim 17, wherein said pressure area is defined by a radially widened area formed between an inner first bearing surface and an outer first bearing surface of the first main piston first flow limiter and the second main piston first flow limiter.

19. The shock absorber as claimed in claim 18, wherein said pressure area covers at least 85% of the total area of the first main piston first flow limiter and the second main piston first flow limiter.

20. The shock absorber as claimed in claim 18, wherein said pressure area covers at least 90% of the total area of the first main piston first flow limiter and the second main piston first flow limiter.

21. The shock absorber as claimed in claim 18, wherein said pressure area covers between 85% and 90% of the total area of the first main piston first flow limiter and the second main piston first flow limiter.

\* \* \* \* \*